US008962510B2

(12) United States Patent
Agapiou et al.

(10) Patent No.: US 8,962,510 B2
(45) Date of Patent: Feb. 24, 2015

(54) CONTINUITY ADDITIVES AND THEIR USE IN POLYMERIZATION PROCESSES

(75) Inventors: Agapios K. Agapiou, Humble, TX (US); Chi-I Kuo, Humble, TX (US); David M. Glowczwski, Baytown, TX (US); Steven K. Ackerman, Baytown, TX (US); Michael D. Awe, Langhorne, PA (US); Ghanshyam H. Patel, Sugar Land, TX (US); Randy D. Ackerman, legal representative, Baytown, TX (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 12/682,148

(22) PCT Filed: Oct. 9, 2008

(86) PCT No.: PCT/US2008/011687
§ 371 (c)(1),
(2), (4) Date: Nov. 16, 2010

(87) PCT Pub. No.: WO2009/048625
PCT Pub. Date: Apr. 16, 2009

(65) Prior Publication Data
US 2011/0077370 A1    Mar. 31, 2011

Related U.S. Application Data

(60) Provisional application No. 60/998,497, filed on Oct. 11, 2007.

(51) Int. Cl.
*B01J 37/00*    (2006.01)
*B01J 31/00*    (2006.01)
(Continued)

(52) U.S. Cl.
CPC .......... *C08F 210/16* (2013.01); *B01J 31/0212* (2013.01); *B01J 31/122* (2013.01);
(Continued)

(58) Field of Classification Search
CPC ............ B01J 37/00; B01J 31/00; C08F 4/06; C08F 4/12
USPC .......................................... 502/132, 152, 170
See application file for complete search history.

(56) References Cited

U.S. PATENT DOCUMENTS

| 5,565,395 A | 10/1996 | Sangokoya et al. ........... 502/103 |
| 6,300,436 B1 | 10/2001 | Agapiou et al. .............. 526/154 |

(Continued)

FOREIGN PATENT DOCUMENTS

| DE | 1143799 B | 2/1963 |
| FR | 2245687 | 4/1975 |
| WO | WO 82/04271 A | 12/1982 |

OTHER PUBLICATIONS

Callender R. L. et al: "Aqueous Synthesis of Water-Soluble Alumoxanes: Environmentall Benign Precursors to Alumina and Aluminum-Based Ceramics" Chemistry of Materials, American Chemical Society, Washington, US, vol. 9, No. 11, Jan. 1, 1997, pp. 2418-2433.
(Continued)

*Primary Examiner* — David W Wu
*Assistant Examiner* — Elizabeth Eng

(57) ABSTRACT

The invention relates to catalyst compositions including at least one catalyst compound and at least one continuity additive such as poly-oxo-metal carboxylate compound and their use in the polymerization of olefins.

11 Claims, 1 Drawing Sheet

(51) Int. Cl.
*C08F 4/06* (2006.01)
*C08F 4/12* (2006.01)
*C08F 210/16* (2006.01)
*B01J 31/02* (2006.01)
*B01J 31/12* (2006.01)
*B01J 31/14* (2006.01)
*B01J 31/18* (2006.01)
*B01J 31/22* (2006.01)
*C08F 4/659* (2006.01)
*C08F 4/6592* (2006.01)

(52) U.S. Cl.
CPC ............... *B01J 31/14* (2013.01); *B01J 31/143* (2013.01); *B01J 31/1805* (2013.01); *B01J 31/181* (2013.01); *B01J 31/2208* (2013.01); *B01J 31/2295* (2013.01); *B01J 2531/22* (2013.01); *B01J 2531/31* (2013.01); *B01J 2531/40* (2013.01); *B01J 2531/46* (2013.01); *B01J 2531/48* (2013.01); *B01J 2531/49* (2013.01); *B01J 2531/50* (2013.01); *B01J 2531/60* (2013.01); *C08F 4/659* (2013.01); *C08F 4/65916* (2013.01); *C08F 4/65927* (2013.01)

USPC ........... 502/170; 502/132; 502/171; 526/154; 526/226

(56) References Cited

U.S. PATENT DOCUMENTS

| | | | |
|---|---|---|---|
| 6,306,984 B1 | 10/2001 | Agapiou et al. | 526/154 |
| 6,322,890 B1 * | 11/2001 | Barron et al. | 428/402 |
| 6,391,819 B1 | 5/2002 | Agapiou et al. | 502/170 |
| 6,472,342 B2 | 10/2002 | Agapiou et al. | 502/170 |
| 6,472,903 B1 | 10/2002 | Veenstra et al. | 326/38 |
| 6,608,153 B2 * | 8/2003 | Agapiou et al. | 526/154 |
| 6,660,815 B2 | 12/2003 | Agapiou et al. | 526/130 |
| 2006/0142152 A1 | 6/2006 | Coalter, III et al. | 502/305 |

OTHER PUBLICATIONS

Berci, J. et al.: "Actual ecological aspects of lubricant additives" Additives in Petroleum Refinery and Petroleum Product Formulation Practice, Proceedings, Sopron, Hung., May 21-23, 1997, 1997, pp. 23-29.

* cited by examiner

US 8,962,510 B2

CONTINUITY ADDITIVES AND THEIR USE IN POLYMERIZATION PROCESSES

CROSS REFERENCE TO RELATED APPLICATIONS

This application is a National Stage application under 35 U.S.C. §371 of International Application No. PCT/US2008/011687, filed Oct. 9, 2008, that claims the benefit of Ser. No. 60/998,497, filed Oct. 11, 2007, the disclosures of which are incorporated by reference in their entireties.

FIELD OF THE INVENTION

The present invention relates generally to polymerization processes for the production of polyolefins. In particular, but without limitation, the invention relates to the use of continuity additives in polymerization processes.

BACKGROUND

There has been a focus in the industry on developing new and improved olefin polymerization processes. Advances in polymerization processes and catalysis have resulted in the ability to produce many new polymers having improved physical and chemical properties useful in a wide variety of superior products and applications. With the development of new catalysts, the choice of polymerization type (e.g., solution, slurry, high pressure or gas phase) for producing a particular polymer has been greatly expanded. Illustrative of the advances in catalysis is the development of metallocene catalyst systems. Exemplary catalyst compounds for use in a process for polymerizing olefins and methods for preparing such catalyst compounds are described in, for example, U.S. Pat. Nos. 6,608,153, 6,472,342, 6,391,819, 6,306,984 and 6,300,436.

A polymerization process such as a gas phase (GP) process may exhibit melting and fusion of polymer particles as a result of the exothermic nature of the reactions involving metallocene and other catalyst compounds. Particularly with a fluid bed GP process, fused and agglomerated granular polymer particles may cause fouling and sheeting in the reactor environment causing disruption in continuity and ineffective operation of various reactor systems. Thus, reducing the fusion of polymer particles is a major objective for polyolefin producers.

Various techniques and compositions have been developed that are said to result in improved reactor operability. One method is to operate the reactor at lower temperatures than the Melt Initiation Temperature (MIT) of the polymer produced. Another method is to introduce an antistatic agent and/or continuity additive into a reactor before or during a fluid bed polymerization reaction to reduce sheeting and/or fouling in the reactor during polymerization. Various continuity additives used in polymerization processes are described in U.S. Pat. Nos. 6,482,903, 6,660,815, 6,306,984 and 6,300,436. Typically, a continuity additive is not catalytic but may be combined with a catalyst before or after being introduced into the reactor. An example of a continuity additive, such as a metal carboxylate, may be commonly utilized either on the catalyst or introduced separately in the reactor during polymerization. It is believed that the presence of metal carboxylates such as aluminum stearate (AlSt) on the catalyst or its proximity can prevent new polymer particles from agglomerating as the active catalyst site begins the polymerization process with heat generation, thereby preventing overheating and melting. As the polymer particles begin to melt, AlSt with its high melting point may act as a gelling agent to prevent reactor fouling and sheeting.

While the techniques and compositions previously described may result in some improvement in reactor operability, some are costly to employ and/or may exhibit other drawbacks. Operating the polymerization reactor at lower than desired temperatures, i.e., below the MIT, could cause significantly reduced catalyst production rates. The continuity additives previously mentioned may also cause a significant reduction in catalyst activity. AlSt, in particular, may exhibit low solubility and may gel when heated in hydrocarbons such as iso-pentane and hexanes at elevated temperatures. The gelled AlSt slurry exhibits high viscosity and may be difficult to handle.

In order to improve operability in reactors, oil slurry continuity additives may be pumped directly into the reactor when reacting with catalysts systems. The drawbacks with utilizing oil slurry continuity additives may include the relatively complex nature of the oil slurry preparation method wherein extra drying steps are needed for both oil and AlSt to reduce moisture content. Also, the transportation of oil slurry containers throughout the world may be costly. Furthermore, a mixing skid may be required to ensure that homogenous AlSt slurry is charged into the reactor. Another drawback with utilizing an oil slurry continuity additive is that it may cause a reduction in the activity of certain catalyst systems. Thus, there is still a need for compositions and processes that are effective in improving reactor operability during polymerization processes by reducing the fusion of polymer particles while maintaining the activity of the catalyst compounds.

SUMMARY

In a class of embodiments, the invention provides for a catalyst composition comprising a catalyst and a poly-oxo-metal carboxylate compound.

In another class of embodiments, the invention provides for a process of polymerization olefins including the step of contacting olefins and a poly-oxo-metal carboxylate compound in the presence of a catalyst composition.

In yet another illustrative class of embodiments, the invention provides for a method of producing a catalyst composition where the method includes the steps of providing a catalyst and mixing the catalyst with a poly-oxo-metal carboxylate compound.

DETAILED DESCRIPTION

Figure 1:
FIG. 1 depicts raw polymer resin heated at 140° C.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless otherwise noted with Roman numerals corresponding to the previous IUPAC form also appearing therein.

The invention is directed to a catalyst composition and product capabilities using the catalyst composition. It is further directed to polymerization processes having improved reactor operability and reduced sheeting and fouling as a result of a reduction in the fusion of polymer particles. It has been surprisingly discovered that using particular additives in combination with a catalyst composition may result in a substantially improved polymerization process and reduction in the fusion of polymer particles.

Catalysts

Any catalyst or combination of catalysts utilized to polymerize olefins are suitable for use in the polymerizing processes and compositions of the present invention. The following is a discussion of various catalysts useful in the invention set forth for the purpose of explanation and not limitation.

General Definitions

As used herein, a "catalyst system" may include at least one activator or alternatively, at least one cocatalyst. A catalyst system may also include other components, for example, supports, and is not limited to the catalyst component and/or activator or cocatalyst alone in or combination. The catalyst system may include any suitable number of catalyst components in any combination as described herein, as well as any activator or cocatalyst in any combination as described herein.

As used herein, a "catalyst compound" may include any compound that, when activated, is capable of catalyzing the polymerization or oligomerization of olefins, wherein the catalyst compound comprises at least one Group 3 to 12 atom, and optionally at least one leaving group bound thereto.

Conventional Catalysts

Conventional catalysts are those traditional Ziegler-Natta catalysts and Phillips-type chromium catalyst well known in the art. Examples of conventional-type transition metal catalysts are disclosed in U.S. Pat. Nos. 4,115,639, 4,077,904 4,482,687, 4,564,605, 4,721,763, 4,879,359 and 4,960,741. The conventional-type transition metal catalyst compounds that may be used in the present invention include, but are not limited to transition metal compounds from Groups III to VIII of the Periodic Table of the Elements. All reference to the Periodic Table of the Elements herein shall refer to the Periodic Table of the Elements, published and copyrighted by the International Union of Pure and Applied Chemistry, Inc., 2004. Also, any reference to a Group or Groups shall be to the Group or Groups as reflected in this Periodic Table of the Elements using the IUPAC system for numbering groups.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R may include alkoxy, phenoxy, bromide, chloride and fluoride. Conventional-type transition metal catalysts where M is titanium may include, but are not limited to, $TiCl_4$, $TiBr_4$, $Ti(OC_2H_5)_3Cl$, $Ti(OC_2H_5)Cl_3$, $Ti(OC_4H_9)_3$ Cl, $Ti(OC_3H_7)_2Cl_2$, $Ti(OC_2H_5)_2Br_2$, $TiCl_3.1/3AlCl_3$ and $Ti(OC_{12}H_{25})Cl_3$.

Conventional-type transition metal catalyst compounds based on magnesium/titanium electron-donor complexes that are useful in the invention are described in, for example, U.S. Pat. Nos. 4,302,565 and 4,302,566. The $MgTiCl_6$ (ethyl acetate)$_4$ derivative is one such example. British Patent Application 2,105,355 describes various conventional-type vanadium catalyst compounds. Non-limiting examples of conventional-type vanadium catalyst compounds include vanadyl trihalide, alkoxy halides and alkoxides such as $VOCl_3$, $VOCl_2$ (OBu) where Bu=butyl and $VO(OC_2H_5)_3$; vanadium tetrahalide and vanadium alkoxy halides such as $VCl_4$ and $VCl_3$ (OBu); vanadium and vanadyl acetyl acetonates and chloroacetyl acetonates such as $V(AcAc)_3$ and $VOCl_2(AcAc)$ where (AcAc) is an acetyl acetonate. Examples of conventional-type vanadium catalyst compounds are $VOCl_3$, $VCl_4$ and $VOCl_2$—OR where R is a hydrocarbon radical, preferably a $C_1$ to $C_{10}$ aliphatic or aromatic hydrocarbon radical such as ethyl, phenyl, isopropyl, butyl, propyl, n-butyl, isobutyl, tertiary-butyl, hexyl, cyclohexyl, naphthyl, etc., and vanadium acetyl acetonates.

Conventional-type chromium catalyst compounds, often referred to as Phillips-type catalysts, suitable for use in the present invention may include $CrO_3$, chromocene, silyl chromate, chromyl chloride ($CrO_2Cl_2$), chromium-2-ethyl-hexanoate, chromium acetylacetonate ($Cr(AcAc)_3$), and the like. Non-limiting examples are disclosed in, for example, U.S. Pat. Nos. 3,242,099 and 3,231,550.

Still other conventional-type transition metal catalyst compounds and catalyst systems suitable for use in the present invention are disclosed in U.S. Pat. Nos. 4,124,532, 4,302,565, 4,302,566 and 5,763,723 and published EP-A2 0 416 815 A2 and EP-A1 0 420 436. The conventional-type transition metal catalysts of the invention may also have the general formula $M'_1M''X_{2t}Y_uE$, where M' is Mg, Mn and/or Ca; t is a number from 0.5 to 2; M" is a transition metal Ti, V and/or Zr; X is a halogen, preferably Cl, Br or I; Y may be the same or different and is halogen, alone or in combination with oxygen, —NR.sub.2, —OR, —SR, —COOR, or —OSOOR, where R is a hydrocarbyl radical, in particular an alkyl, aryl, cycloalkyl or arylalkyl radical, acetylacetonate anion in an amount that satisfies the valence state of M'; u is a number from 0.5 to 20; E is an electron donor compound selected from the following classes of compounds: (a) esters of organic carboxylic acids; (b) alcohols; (c) ethers; (d) amines; (e) esters of carbonic acid; (f) nitriles; (g) phosphoramides, (h) esters of phosphoric and phosphorus acid, and (j) phosphorus oxy-chloride. Non-limiting examples of complexes satisfying the above formula include: $MgTiCl_5.2CH_3COOC_2H_5$, $Mg_3Ti_2Cl_{12}7CH_3COOC_2H_5$, $MgTiCl_5.6C_2H_5OH$, $MgTiCl_5.100CH_3OH$, $MgTiCl_5$ tetrahydrofuran, $MgTi_2Cl_{12}7C_6H_5CN$, $MgTi_2Cl_{12}6C_6H_5COOC_2H_5$, $MgTiCl_62CH_3COOC_2H_5$, $MgTiCl_66C_5H_5N$, $MgTiCl_5(OCH_3)2CH_3COOC_2H_5$, $MgTiCl_5N(C_6H_5)_23CH_3COOC_2H_5$, $MgTiBr_2Cl_42(C_2H_5)O$, $MnTiCl_54C_2H_5OH$, $Mg_3V_2Cl_{12}.7CH_3COOC_2H_5$, $MgZrCl_64$tetrahydrofuran. Other catalysts may include cationic catalysts such as $AlCl_3$, and other cobalt and iron catalysts well known in the art.

The conventional-type transition metal catalyst compounds disclosed herein may be activated with one or more of the conventional-type cocatalysts described below.

Cocatalysts and Other Components

Conventional-type cocatalyst compounds for the above conventional-type transition metal catalyst compounds may be represented by the formula $M^3M^4_v X^2_c R^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexyl-aluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IHA metals. Non-limiting examples of such conventional-type cocatalyst compounds may include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds are known to those in the art and a more complete discussion of these compounds may be found in U.S. Pat. Nos. 3,221,002 and 5,093,415.

For purposes of this patent specification and appended claims, conventional catalyst compounds exclude those metallocene catalyst compounds discussed below.

Metallocene Catalysts

Generally, metallocene catalyst compounds may contain one or more ligands including cyclopentadienyl (Cp) or cyclopentadienyl-type structures or other similar functioning structure such as pentadiene, cyclooctatetraendiyl and imides. It is understood by one of skill in the art that references made herein to metallocene catalyst compounds and/or systems may also refer to metallocene-type catalyst compounds and/or systems. As used herein, a catalyst system is a combination of a catalyst compound and a cocatalyst or activator (described below). Typical metallocene compounds are generally described as containing one or more ligands capable of η-5 bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements. Exemplary of these metallocene catalyst compounds and catalyst systems are described in, for example, U.S. Pat. Nos. 4,530,914, 4,871,705, 4,937,299, 5,017,714, 5,055,438, 5,096,867, 5,120,867, 5,124,418, 5,198,401, 5,210,352, 5,229,478, 5,264,405, 5,278,264, 5,278,119, 5,304,614, 5,324,800, 5,347,025, 5,350,723, 5,384,299, 5,391,790, 5,391,789, 5,399,636, 5,408,017, 5,491,207, 5,455,366, 5,534,473, 5,539,124, 5,554,775, 5,621,126, 5,684,098, 5,693,730, 5,698,634, 5,710,297, 5,712,354, 5,714,427, 5,714,555, 5,728,641, 5,728,839, 5,753,577, 5,767,209, 5,770,753 and 5,770,664. Also, the disclosures of European publications such as EP-A-0 591 756, EP-A-0 520 732, EP-A-0 420 436, EP-B1 0 485 822, EP-B1 0 485 823, EP-A2-0 743 324 and EP-B1 0 518 092 and PCT publications WO 91/04257, WO 92/00333, WO 93/08221, WO 93/08199, WO 94/01471, WO 96/20233, WO 97/15582, WO 97/19959, WO 97/46567, WO 98/01455, WO 98/06759 and WO 98/011144 describe typical metallocene catalyst compounds and catalyst systems. Furthermore, metallocene catalyst compounds may contain one or more leaving group(s) bonded to the transition metal atom. For the purposes of this patent specification and appended claims the term "leaving group" may refer to one or more chemical moieties, such as a ligand, bound to the center metal atom of a catalyst component that can be abstracted from the catalyst component by an activator or cocatalyst, thus producing a catalyst species active toward olefin polymerization or oligomerization.

The Cp ligands are generally represented by one or more bonding systems comprising n bonds that can be open systems or ring systems or fused system(s) or a combination thereof These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof Alternatively, the ring(s) or ring system(s) may be composed of carbon atoms such as, but not limited to, those cyclopentadienyl ligands or cyclopentadienyl-type ligand structures (structures isolobal to cyclopentadienyl). The metal atom may be selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment.

In one embodiment, metallocene catalyst compounds of the invention are represented by the formula:

$$L^A L^B M Q_n \qquad (I)$$

wherein each $L^A$ and $L^B$ are bound to the metal atom (M), and each Q is bound to the metal center, n being 0 or an integer from 1 to 4, alternatively 1 or 2, and in another embodiment 2.

In formula (I), M is a metal from the Periodic Table of the Elements and may be a Group 3 to 12 atom or a metal from the lanthanide or actinide series Group atom in one embodiment; selected from the group consisting of Sc, Ti, Zr, Hf, V, Nb, Ta, Mn, Re, Fe, Ru, Os, Co, Rh, Ir, and Ni in another embodiment; and selected from the group consisting of Groups 4, 5 or 6 transition metal in yet another embodiment. In other illustrative embodiments, M is a transition metal from Group 4 such as Ti, Zr or Hf; selected from the group of Zr and Hf in another embodiment; and Zr in yet a more particular embodiment. The oxidation state of M may range from 0 to +7 in one embodiment; and in another embodiment, is +1, +2, +3, +4 or +5; and in yet another illustrative embodiment is +2, +3 or +4. The groups bound to M are such that the compounds described below in the formulas and structures are electrically neutral, unless otherwise indicated. The Cp ligand(s) form at least one chemical bond with the metal atom M to form a metallocene catalyst compound. The Cp ligands are distinct from the leaving groups bound to the catalyst compound in that they are not highly susceptible to substitution/abstraction reactions.

The $L^A$ and $L^B$ groups of formula (I) are Cp ligands, such as cycloalkadienyl ligands and hetrocylic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Also, $L^A$ and $L^B$ may be any other ligand structure capable of η-5 bonding to M and alternatively, $L^A$ and $L^B$ may comprise one or more heteroatoms, for example, nitrogen, silicon, boron, germanium, and phosphorous, in combination with carbon atoms to form a cyclic structure, for example, a heterocyclopentadienyl ancillary ligand. Furthermore, each of $L^A$ and $L^B$ may also be other types of ligands including but not limited to amides, phosphides, alkoxides, aryloxides, imides, carbolides, borollides, porphyrins, phthalocyanines, corrins and other polyazomacrocycles. Each $L^A$ and $L^B$ may be the same or different type of ligand that is -bonded to M. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further illustrative ligands may include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), heterocyclic versions thereof and the like, including hydrogenated versions thereof.

Each $L^A$ and $L^B$ may be unsubstituted or substituted with a combination of substituent R groups. Non-limiting examples of substituent R groups include one or more from the group selected from hydrogen, or linear, branched, alkyl radicals or cyclic alkyl radicals, alkenyl, alkynl or aryl radicals or combination thereof, halogens and the like, including all their isomers, for example tertiary butyl, iso-propyl, etc. In illustrative embodiments, substituent R groups may comprise 1 to 30 carbon atoms or other substituents having up to 50 non-hydrogen atoms that can each be substituted with halogens or heteroatoms or the like. Alkyl or aryl substituent R groups may include, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like. Halogenated hydrocarbyl radicals may include fluoromethyl, fluroethyl, difluroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstitiuted boron radicals including dimethylboron for example; and disubstituted pnictogen or Group 15-containing radicals including dimethylamine, dimethylphosphine, diphenylamine, methylphenylphosphine; and chalcogen or Group 16-containing radicals including methoxy, ethoxy, propoxy, phenoxy, methylsulfide, ethylsulfide and the like. Non-hydrogen substituent R groups may include the atoms carbon, silicon, boron, aluminum, nitrogen, phosphorous, oxygen, tin, germanium and the like including olefins such as but not limited to olefinically unsaturated substituents including vinyl-terminated ligands, for example, but-3-enyl, prop-2-enyl, hex-5-enyl, 2-vinyl, or 1-hexene. Also, at least two R groups, preferably two adjacent R groups may be joined to form a ring structure having from 3 to 30 atoms selected from carbon, nitrogen, oxygen, phosphorous, silicon, germanium, boron or a combination thereof. Also, an R group such as 1-butanyl may form a bond to the metal M.

The leaving groups Q of formula (I) are monoanionic labile ligands bound to M. Depending on the oxidation state of M, the value for n is 0, 1 or 2 such that formula (I) above represents a neutral metallocene catalyst compound, or a positively charged compound. In a class of embodiments, Q may comprise weak bases such as, but not limited to, alkyls, alkoxides, amines, alkylamines, phosphines, alkylphosphines, ethers, carboxylates, dienes, hydrocarbyl radicals having from 1 to 20 carbon atoms, $C_6$ to $C_{12}$ aryls, $C_7$ to $C_{20}$ alkylaryls, $C_7$ to $C_{20}$ arylalkyls, hydrides or halogen atoms (e.g., Cl, Br or I) and the like, and combinations thereof. Other examples of Q radicals include those substituents for R as described above and including cyclohexyl, heptyl, tolyl, trifluromethyl, tetramethylene and pentamethylene, methylidene, methyoxy, ethyoxy, propoxy, phenoxy, bis(N-methylanilide), dimethylamide, dimethylphosphide radicals and the like.

In addition, metallocene catalyst compounds of the invention include those of formula (I) where $L^A$ and $L^B$ are bridged to each other by a bridging group, A. These bridged compounds are known as bridged, metallocene catalyst compounds represented by the formula (II):

$$L^A(A)L^BMQ_n \qquad (II)$$

wherein each $L^A$ and $L^B$ are bound to the metal center M, and each Q is bound to the metal center, n being 0 or an integer from 1 to 4, alternatively 1 or 2, and in another embodiment 2; the groups $L^A$, $L^B$ M and Q are as defined in formula (I); and the divalent bridging group A is bound to both $L^A$ and $L^B$ through at least one bond or divalent moiety, each.

Non-limiting examples of bridging group A from formula (II) include divalent bridging groups containing at least one Group 13 to 16 atom. In one possible embodiment, bridging group A may be referred to as a divalent moiety such as, but not limited to, carbon, oxygen, nitrogen, silicon, germanium and tin or a combination thereof. In other embodiment, bridging group A contains carbon, silicon or germanium atom and in yet another illustrative embodiment, A contains at least one silicon atom or at least one carbon atom. Other non-limiting examples of bridging groups A may be represented by R'$_2$C=, R'$_2$Si=, —(R')$_2$Si(R')$_2$Si—, —(R')$_2$Si(R')$_2$C—, R'$_2$Ge=, —(R')$_2$Si(R')$_2$Ge—, —(R')$_2$Ge(R')$_2$C—, R'N=, R'P=, —(R')$_2$C(R')N—, —(R')$_2$C(R')P—, —(R')$_2$Si(R')N—, —(R')$_2$Si(R')P—, —(R')$_2$Ge(R')N—, —(R')$_2$Ge(R')P—, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' groups may be joined to form a ring or ring system; and independently, each Q can be a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof.

It is also contemplated that in one embodiment, the metallocene catalysts of the invention include their structural or optical or enantiomeric isomers (meso and racemic isomers) and mixtures thereof. In another embodiments, the metallocene compounds of the invention may be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Group 15-Containing Catalysts

One aspect of the present invention includes the use of "Group 15-containing" catalyst components either alone or for use with a metallocene or other olefin polymerization catalyst component. Generally, Group 15-containing catalyst components may include complexes of Group 3 to 12 metal atoms, wherein the metal atom is 2 to 8 coordinate, the coordinating moiety or moieties including at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing compounds are disclosed in, for example, WO 99/01460, EP A1 0 893 454, U.S. Pat. Nos. 5,318,935, 5,889,128, 6,333,389 B2 and 6,271,325 B1.

In a class of embodiments, the Group 15-containing catalyst components may include Group 4 imino-phenol complexes, Group 4 bis(amide) complexes, and Group 4 pyridyl-amide complexes that are active towards olefin polymerization to any extent. In one possible embodiment, the Group 15-containing catalyst component may include a bisamide compound such as $[(2,3,4,5,6\ Me_5C_6)NCH_2CH_2]_2NHZrBz_2$ (from Boulder Chemical).

Mixed Catalysts

It is also within the scope of this invention that one type of catalyst compound described above can be combined with another type of catalyst compound described herein with one or more activators or activation methods described below.

It is further contemplated by the invention that other catalysts can be combined with the metallocene catalyst compounds of the invention. For example, see U.S. Pat. Nos. 4,937,299, 4,935,474, 5,281,679, 5,359,015, 5,470,811, and 5,719,241.

In another embodiment of the invention one or more metallocene catalyst compounds or catalyst systems may be used in combination with one or more conventional-type catalyst compounds or catalyst systems. Non-limiting examples of mixed catalysts and catalyst systems are described in U.S. Pat. Nos. 4,159,965, 4,325,837, 4,701,432, 5,124,418, 5,077,255, 5,183,867, 5,391,660, 5,395,810, 5,691,264, 5,723,399 and 5,767,031 and PCT Publication WO 96/23010 published Aug. 1, 1996.

It is further contemplated that two or more conventional-type transition metal catalysts may be combined with one or more conventional-type cocatalysts. Non-limiting examples of mixed conventional-type transition metal catalysts are described in for example U.S. Pat. Nos. 4,154,701, 4,210,559, 4,263,422, 4,672,096, 4,918,038, 5,198,400, 5,237,025, 5,408,015 and 5,420,090.

Activators and Activation Methods for Catalyst Compounds

An activator is defined as any combination of reagents that increases the rate at which a transition metal compound oligomerizes or polymerizes unsaturated monomers, such as olefins. The transition metal compounds according to the invention may be activated for oligomerization and/or polymerization catalysis in any manner sufficient to allow coordination or cationic oligomerization and or polymerization.

Generally, catalysts may contain a formal anionic ligand, such as hydride or hydrocarbyl, with an adjacent (cis) coordination site accessible to an unsaturated monomer. Coordination of an unsaturated monomer to the cis coordination site allows a migratory insertion reaction to form a metal alkyl. Repetition of this process causes the chain growth associated with oligomerization and/or polymerization. An activator is thus any combination of reagents that facilitates formation of a transition metal compound containing cis coordinated olefin and hydride or hydrocarbyl.

When the transition metal compound contains at least one hydride or hydrocarbyl ligand, activation can be achieved by removal of formal anionic or neutral ligand(s), of higher binding affinity than the unsaturated monomer. This removal, also called abstraction, process may have a kinetic rate that is first-order or non-first order with respect to the activator. Activators that remove anonic ligands are termed ionizing activators. Alternatively, activators that remove neutral ligands are termed non-ionizing activators. Activators may be strong Lewis-acids which may play either the role of an ionizing or non-ionizing activator.

When the transition metal compound does not contain at least one hydride or hydrocarbyl ligands, then activation may be a one step or multi step process. One step in this process includes coordinating a hydride or hydrocarbyl group to the metal compound. A separate activation step is removal of anionic or neutral ligands of higher binding affinity than the unsaturated monomer. These activation steps may occur in the presence of an olefin and occur either in series or in parallel. More than one sequence of activation steps is possible to achieve activation.

The activator may also act to coordinate a hydride or hydrocarbyl group to the transition metal compound. When the transition metal compound does not contain at least one hydride or hydrocarbyl ligands but does contain at least one functional group ligand, activation may be effected by substitution of the functional group with a hydride, hydrocarbyl or substituted hydrocarbyl group. This substitution may be effected with appropriate hydride or alkyl reagents of group 1, 2, 12, 13 elements as are known in the art. To achieve activation, it may be necessary to also remove anionic or neutral ligands of higher binding affinity than the unsaturated monomer.

Alumoxane and aluminum alkyl activators are capable of alkylation and abstraction activation.

The activator may also act to coordinate a hydride or hydrocarbyl group to the transition metal compound. If the transition metal compound does not contain anionic ligands, then a hydride, hydrocarbyl or substituted hydrocarbyl may be coordinated to a metal using electrophilic proton or alkyl transfer reagents represented by $H^+(LB)_nA^-$, $(R^9)^+(LB)_nA^-$. $R^9$ may be a hydrocarbyl or a substituted hydrocarbyl; LB is a Lewis-base, and wherein n=0, 1 or 2. Non-limiting examples of preferred Lewis-bases are diethyl ether, dimethyl ether, ethanol, methanol, water, acetonitrile, N,N-dimethylaniline. $A^-$ is an anion, preferably a substituted hydrocarbon, a functional group, or a non-coordinating anion. Non-limiting examples of $A^-$ may include halides, carboxylates, phosphates, sulfates, sulfonates, borates, aluminates, alkoxides, thioalkoxides, anionic substituted hydrocarbons, anionic metal complexes and the like.

Other activators include those described in WO 98/07515 such as tris (2,2',2"-nonafluorobiphenyl) fluoroaluminate. Combinations of activators are also contemplated by the invention, for example, alumoxanes and ionizing activators in combinations, see for example, EP-B1 0 573 120, WO 94/07928 and WO 95/14044 and U.S. Pat. Nos. 5,153,157 and 5,453,410. WO 98/09996 describes activating metallocene catalyst compounds with perchlorates, periodates and iodates including their hydrates. WO 98/30602 and WO 98/30603 describe the use of lithium (2,2'-bisphenyl-ditrimethylsilicate). 4THF as an activator for a metallocene catalyst compound. WO 99/18135 describes the use of organo-boronaluminum activators. EP-B1-0 781 299 describes using a silylium salt in combination with a non-coordinating compatible anion. WO 2007/024773 suggests the use of activator-supports which may comprise a chemically-treated solid oxide, clay mineral, silicate mineral, or any combination thereof. Also, methods of activation such as using radiation (see EP-B1-0 615 981), electro-chemical oxidation, and the like are also contemplated as activating methods for the purposes of rendering the neutral metallocene catalyst compound or precursor to a metallocene cation capable of polymerizing olefins. Other activators or methods for activating a metallocene catalyst compound are described in, for example, U.S. Pat. Nos. 5,849,852, and 5,869,723 and PCT WO 98/32775.

Aluminoxane and Aluminum Alkyl Activators

In one embodiment, alumoxanes activators may be utilized as an activator in the catalyst composition of the invention. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 594 218 A1 and WO 94/10180.

When the activator is an alumoxane (modified or unmodified), some embodiments select the maximum amount of activator at a 5000-fold molar excess Al/M over the catalyst precursor (per metal catalytic site). The minimum activator-to-catalyst-precursor is a 1:1 molar ratio.

Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in, for example, U.S. Pat. Nos. 4,665, 208, 4,952,540, 5,091,352, 5,206,199, 5,204,419, 4,874,734, 4,924,018, 4,908,463, 4,968,827, 5,308,815, 5,329,032, 5,248,801, 5,235,081, 5,157,137, 5,103,031, 5,391,793, 5,391,529, 5,693,838, 5,731,253, 5,731,451, 5,744,656, 5,847,177, 5,854,166, 5,856,256 and 5,939,346 and European publications EP-A-0 561 476, EP-B1-0 279 586, EP-A-0 594-218 and EP-B1-0 586 665, WO 94/10180 and WO 99/15534. It may be preferable to use a visually clear methylalumoxane. A cloudy or gelled alumoxane can be filtered to produce a clear solution or clear alumoxane can be decanted from the cloudy solution. Another alumoxane is a modified methyl alumoxane (MMAO) cocatalyst type 3A (commercially available from Akzo Chemicals, Inc. under the trade name Modified Methylalumoxane type 3A, disclosed in U.S. Pat. No. 5,041,584).

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

Ionizing Activators

It is within the scope of this invention to use an ionizing or stoichiometric activator, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, for example, WO 98/43983), boric acid (see, for example, U.S. Pat. No. 5,942,459) or a combination thereof It is also within the scope of this invention to use neutral or ionic activators alone or in combination with alumoxane or modified alumoxane activators.

Examples of neutral stoichiometric activators may include tri-substituted boron, tellurium, aluminum, gallium and indium or mixtures thereof The three substituent groups may be each independently selected from the group of alkyls, alkenyls, halogen, substituted alkyls, aryls, arylhalides, alkoxy and halides. Preferably, the three substituent groups may be independently selected from the group of halogen, mono or multicyclic (including halosubstituted) aryls, alkyls, and alkenyl compounds and mixtures thereof; in a class of embodiments are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). Alternatively, the three groups are alkyls having 1 to 4 carbon groups, phenyl, napthyl or mixtures thereof. In other embodiments, the three groups are halogenated, preferably fluorinated, aryl groups. In yet other illustrative embodiments, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in, for example, European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994.

By way of example, activators may include a cation and an anion component, and may be represented by the following formula:

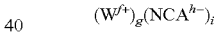

$W^{f+}$ is a cation component having the charge f+; $NCA^{h-}$ is a non-coordinating anion having the charge h−; f is an integer from 1 to 3; h is an integer from 1 to 3; g and h are constrained by the relationship: $(g) \times (f) = (h) \times (i)$. The cation component, $(W^{f+})$ may include Bronsted acids such as protons or protonated Lewis bases or reducible Lewis acids capable of protonating or abstracting a moiety, such as an akyl or aryl, from an analogous metallocene or Group 15-containing catalyst precursor, resulting in a cationic transition metal species.

In an illustrative embodiment, the activators include a cation and an anion component, and may be represented by the following formula: $(LB-H^{f+})_g(NCA^{h-})_i$ wherein LB is a neutral Lewis base; H is hydrogen; $NCA^{h-}$ is a non-coordinating anion having the charge h−; f is an integer from 1 to 3; h is an integer from 1 to 3; g and h are constrained by the relationship: $(g) \times (f) = (h) \times (i)$.

The activating cation $(W^{f+})$ may be a Bronsted acid, $(LB-H^{f+})$, capable of donating a proton to the transition metal catalytic precursor resulting in a transition metal cation, including ammoniums, oxoniums, phosphoniums, silyliums and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxoniums from ethers such as dimethyl ether diethyl ether, tetrahydrofuran and dioxane, sulfoniums from thioethers, such as diethyl thioethers and tetrahydrothiophene and mixtures thereof.

The activating cation ($W^{d+}$) may also be an abstracting moiety such as silver, carboniums, tropylium, carbeniums, ferroceniums and mixtures, preferably carboniums and ferroceniums. Most preferably ($W^{d+}$) is triphenyl carbonium or N, N-dimethylanilinium.

The anion component ($NCA^{h-}$) includes those having the formula $[T^{j+}Q_k]^{h-}$ wherein j is an integer from 1 to 3; k is an integer from 2 to 6; k−j=h; T is an element selected from Group 13 or 15 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, wherein Q may have up to 20 carbon atoms with the condition that in not more than 1 occurrence is Q a halide. Preferably, each Q is a fluorinated hydrocarbyl group having 1 to 20 carbon atoms, alternatively each Q may be a fluorinated aryl group, and in another embodiment, each Q is a pentafluoryl aryl group. Examples of suitable ($NCA^{h-}$) also include diboron compounds as disclosed in U.S. Pat. No. 5,447,895.

Additional suitable anions are known in the art and will be suitable for use with the catalysts of the invention. See for example, U.S. Pat. No. 5,278,119 and the review articles by S. H. Strauss, "The Search for Larger and More Weakly Coordinating Anions", Chem. Rev., 93, 927 942 (1993) and C. A. Reed, "Carboranes: A New Class of Weakly Coordinating Anions for Strong Electrophiles, Oxidants and Superacids", Acc. Chem. Res., 31, 133 139 (1998).

Illustrative, but not limiting examples of boron compounds which may be used as activating cocatalysts in the preparation of the improved catalysts of this invention are tri-substituted ammonium salts such as: trimethylammonium tetraphenylborate, triethylammonium tetraphenylborate, tripropylammonium tetraphenylborate, tri(n-butyl)ammonium tetraphenylborate, tri(t-butyl)ammonium tetraphenylborate, N,N-dimethylanilinium tetraphenylborate, N,N-diethylanilinium tetraphenylborate, N,N-dimethyl-(2,4,6-trimethylanilinium) tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium) tetrakis(pentafluorophenyl)borate, trimethylammonium tetrakis-(2,3,4,6-tetrafluorophenylborate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluoro-phenyl)borate, dimethyl(t-butyl)ammonium tetrakis-(2,3,4,6-tetrafluorophenyl)borate, N,N-dimethylanilinium tetrakis-(2,3,4,6-tetrafluorophenyl)borate, N,N-diethylanilinium tetrakis-(2,3,4,6-tetrafluoro-phenyl)borate, and N,N-dimethyl-(2,4,6-trimethylanilinium)tetrakis-(2,3,4, 6-tetrafluoropheny-1) borate; dialkyl ammonium salts such as: di-(i-propyl)ammonium tetrakis(pentafluorophenyl)borate, and dicyclohexylammonium tetrakis(pentafluorophenyl) borate; and tri-substituted phosphonium salts such as: triphenylphosphonium tetrakis(pentafluorophenyl)borate, tri (o-tolyl)phosphonium tetrakis(pentafluorophenyl)borate, and tri(2,6-dimethylphenyl)phosphonium tetrakis(pentafluorophenyl)borate.

In one possible embodiment, the ionic stoichiometric activator is N,N-dimethylanilinium tetra(perfluorophenyl)borate or triphenylcarbenium tetra(perfluorophenyl)borate.

An activation method using ionizing ionic compounds not containing an active proton but capable of producing a metallocene catalyst cation and its non-coordinating anion are also contemplated, and are described in, for example, EP-A-0 426 637, EP-A-0 573 403 and U.S. Pat. No. 5,387,568.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Non-coordinating anions useful in accordance with this invention are those that are compatible, stabilize the metal cation in balancing its ionic charge, yet retain sufficient lability to permit displacement by an ethylenically or acetylenically unsaturated monomer during polymerization. These types of cocatalysts may use tri-isobutyl aluminum or tri-octyl aluminum as a scavenger.

Processes of the current invention also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878, 5,486,632, and 5,527,929.

Additional neutral Lewis-acids are known in the art and are suitable for abstracting anionic ligands. See, for example, the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391 1434 (2000).

When the transition metal compound does not contain at least one hydride or hydrocarbyl ligand but does contain at least one functional group ligand, such as chloride, amido or alkoxy ligands, and the functional group ligand(s) are not capable of discrete ionizing abstraction with the ionizing, anion pre-cursor compounds, these functional group ligands can be converted via known alkylation reactions with organometallic compounds such as lithium or aluminum hydrides or alkyls, alkylalumoxanes, Grignard reagents, etc. See, for example, EP-A-0 500 944, EP-A1-0 570 982 and EP-A1-0 612 768 for analogous processes describing the reaction of alkyl aluminum compounds with analogous dihalide substituted metallocene compounds prior to or with the addition of activating noncoordinating anion precursor compounds.

Other Activators

Activators are typically strong Lewis-acids which may play either the role of ionizing or non-ionizing activator. Activators previously described as ionizing activators may also be used as non-ionizing activators.

Abstraction of formal neutral ligands may be achieved with Lewis acids that display an affinity for the formal neutral ligands. These Lewis acids are typically unsaturated or weakly coordinated. Examples of non-ionizing activators may include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene. Non-ionizing activators may also include weakly coordinated transition metal compounds such as low valence olefin complexes. Non-limiting examples of non-ionizing activators include $BMe_3$, $BEt_3$, $B(iBu)_3$, $BPh_3$, $B(C_6F_5)_3$, $AlMe_3$, $AlEt_3$, $Al(iBu)_3$, $AlPh_3$, $B(C_6F_5)_3$, alumoxane, CuCl, $Ni(1,5\text{-cyclooctadiene})_2$.

Additional neutral Lewis-acids are known in the art and will be suitable for abstracting neutral ligands. See, for example, the review article by E. Y.-X. Chen and T. J. Marks, "Cocatalysts for Metal-Catalyzed Olefin Polymerization: Activators, Activation Processes, and Structure-Activity Relationships", Chem. Rev., 100, 1391 1434 (2000).

Ilustrative non-ionizing activators include $R^{10}(R^{11})_3$, where $R^{10}$ is a group 13 element and $R^{11}$ is a hydrogen, a hydrocarbyl, a substituted hydrocarbyl, or a functional group. Typically, $R^{11}$ is an arene or a perfluorinated arene.

Alternative non-ionizing activators include $B(R^{12})_3$, where $R^{12}$ is an arene or a perfluorinated arene. Even more non-ionizing activators include $B(C_6H_5)_3$ and $B(C_6F_5)_3$. A particularly preferred non-ionizing activator is $B(C_6F_5)_3$. More preferred activators are ionizing and non-ionizing activators based on perfluoroaryl borane and perfluoroaryl borates such as $PhNMe_2H^+B(C_6F_5)_4^-$, $(C_6H_5)_3C^+B(C_6F_5)_4^-$, and $B(C_6F_5)_3$.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl) boron can be used with methylalumoxane.

In general, the precursor compounds and the activator are combined in ratios of about 1000:1 to about 0.5:1. In an embodiment the precursor compounds and the activator are combined in a ratio of about 300:1 to about 1:1, alternatively about 150:1 to about 1:1, for boranes, borates, aluminates, etc. the ratio is about 1:1 to about 10:1 and for alkyl aluminum compounds (such as diethylaluminum chloride combined with water) the ratio is about 0.5:1 to about 10:1.

At times two or more catalyst precursor compounds may be present. In some embodiments, the ratio of the first catalyst precursor compound to the second or additional catalyst precursor compounds is 5:95 to 95:5, alternatively 25:75 to 75:25, in other embodiment 40:60 to 60:40.

The catalyst compositions of this invention may include a support material or carrier. For example, the one or more catalyst components and/or one or more activators may be deposited on, contacted with, vaporized with, bonded to, or incorporated within, adsorbed or absorbed in, or on, one or more supports or carriers.

The support material is any of the conventional support materials. The supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof Illustrative support materials such as inorganic oxides include Group 2, 3, 4, 5, 13 or 14 metal oxides. The preferred supports include silica, which may or may not be dehydrated, fumed silica, alumina (see, for example, WO 99/60033), silica-alumina and mixtures thereof Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as disclosed in WO 99/47598, aerogels as disclosed in WO 99/48605, spherulites as disclosed in U.S. Pat. No. 5,972, 510 and polymeric beads as disclosed in WO 99/50311.

The support material, such as an inorganic oxide, may have a surface area in the range of from about 10 to about 700 $m^2$/g, pore volume in the range of from about 0.1 to about 4.0 cc/g and average particle size in the range of from about 5 to about 500 μm. More preferably, the surface area of the support material is in the range of from about 50 to about 500 $m^2$/g, pore volume of from about 0.5 to about 3.5 cc/g and average particle size of from about 10 to about 200 μm. Most preferably the surface area of the support material is in the range is from about 100 to about 400 $m^2$/g, pore volume from about 0.8 to about 3.0 cc/g and average particle size is from about 5 to about 100 μm. The average pore size of the carrier of the invention typically has pore size in the range of from 10 to 1000 Å, alternatively 50 to about 500 Å, and in some embodiment 75 to about 350 Å.

Methods for Supporting

The above described metallocene catalyst compounds and catalyst systems as well as conventional-type transition metal catalyst compounds and catalyst systems may be combined with one or more support materials or carriers using one of the support methods well known in the art or as described below. In one possible embodiment, the method of the invention uses a catalyst, such as a metallocene or a conventional-type transition metal catalyst, in a supported form. For example, in another embodiment, a metallocene catalyst compound or catalyst system is in a supported form, for example, deposited on, contacted with, or incorporated within, adsorbed or absorbed in, or on, a support or carrier.

The terms "support" or "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, or any other organic or inorganic support material and the like, or mixtures thereof.

Inorganic oxides may include Group 2, 3, 4, 5, 13 or 14 metal oxides. The supports may include, but are not limited to, silica, alumina, silica-alumina, magnesium chloride, and mixtures thereof. Other useful supports may include magnesia, titania, zirconia, montmorillonite (see for example, EP-B1 0 511 665) and other clays and nanoclays, graphite, zeolites and the like. Also, combinations of these support materials may be used, for example, silica-chromium, silica-alumina, silica-titania and the like.

In one embodiment, the carrier, such as an inorganic oxide, may have a surface area in the range of from about 10 to about 700 $m^2$/g, pore volume in the range of from about 0.1 to about 4.0 cc/g and average particle size in the range of from about 1 to about 500 μm. Alternatively, the surface area of the carrier may be in the range of from about 50 to about 500 $m^2$/g, pore volume of from about 0.5 to about 3.5 cc/g and average particle size of from about 10 to about 200 μm. In another embodiment, the surface area of the carrier is in the range is from about 100 to about 400 $m^2$/g, pore volume from about 0.8 to about 3.0 cc/g and average particle size is from about 5 to about 100 μm. In yet another illustrative embodiment, the average pore size of the carrier is from about 1 to about 50 μm The average pore size of the carrier of the invention typically has pore size in the range of from 10 to 1000 Å preferably 50 to about 500 Å and most preferably 75 to about 350 Å.

In one embodiment, the metallocene catalyst compounds of the invention may be supported on the same or separate supports together with an activator, or the activator may be used in an unsupported form, or may be deposited on a support different from the supported metallocene catalyst compounds of the invention, or any combination thereof. This may be accomplished by any technique commonly used in the art.

There are various other methods in the art for supporting a polymerization catalyst compound or catalyst system of the invention. For example, the metallocene catalyst compound of the invention may contain a polymer bound ligand as described in, for example, U.S. Pat. No. 5,770,755; the metallocene catalyst system of the invention may be spray dried as described in, for example, U.S. Pat. No. 5,648,310; the support used with the metallocene catalyst system of the invention may be functionalized as described in European publication EP-A-0 802 203, or at least one substituent or leaving group is selected as described in U.S. Pat. No. 5,688,880.

In one embodiment, the invention provides for a supported metallocene catalyst system that may limit the use of any antistatic agents or surface modifiers that are typically used in the preparation of the supported catalyst systems. As used herein, "surface modifiers" may include compounds such as, but not limited to, ethoxylated amines (e.g., IRGASTAT AS-990 from Ciba), mercaptans (e.g., octylmercaptan), surfactants, sulfonates, Group 1 or 2 cations, and other organic and inorganic additives that are added to the catalyst composition (metallocene, activator and support material) or directly to the reactor to improve reactor performance by, for example, reducing fouling or sheeting of polymer on the inner surfaces of the reactor, or by reducing the formation of large chunks (greater than 1 or 2 cm diameter/length) of polymer from forming. The surface modifier excludes activator compounds, and in fact, surface modifiers may inhibit catalyst activity.

One method for producing the supported metallocene catalyst system of the invention is described as follows: the metallocene catalyst compound is slurried in a liquid to form a metallocene solution and a separate solution is formed containing an activator and a liquid. The liquid may be any compatible solvent or other liquid capable of forming a solution or the like with the metallocene catalyst compounds and/or activator of the invention. In one embodiment the liquid is a cyclic aliphatic or aromatic hydrocarbon. The metallocene catalyst compound and activator solutions are mixed together and added to a porous support or the porous support is added to the solutions such that the total volume of the metallocene catalyst compound solution and the activator solution or the metallocene catalyst compound and activator solution is less than four times the pore volume of the porous support, more preferably less than three times, even more preferably less than two times; ranges being from 1.1 times to 3.5 times range and most preferably in the 1.2 to 3 times range. The supported metallocene catalyst system may be formed by other suitable methods known in the art.

In a class of embodiments of the invention, olefin(s) or alpha-olefin(s), such as ethylene, propylene or combinations thereof, including other comonomers, are prepolymerized in the presence of the catalyst system of the invention prior to the main polymerization. The prepolymerization can be carried out batchwise or continuously in gas, solution, or slurry phase including at elevated pressures. The prepolymerization can take place with any olefin monomer or combination and/or in the presence of any molecular weight controlling agent. For examples of prepolymerization procedures, see U.S. Pat. Nos. 4,748,221, 4,923,833, 4,921,825, 5,283,278 and 5,705,578, EP-B-0279 863 and WO 97/44371. A prepolymerized catalyst system for purposes of this patent specification and appended claim is a supported catalyst system, in accord with a class of embodiments.

Poly-Oxo-Metal Carboxylate Compounds

Poly-oxo-metal carboxylate compounds may be suitable for use in accordance with the present invention as a continuity additive (CA). "Poly-oxo-metal carboxylate compound" is any linear or cyclic compound with at least one (e.g., di-, tri- or multiple) carboxylic acid group and at least one Group 2 to 14 metal atom.

In a class of embodiments, the poly-oxo-metal carboxylate compound may have the formula $(MQO)_n$. It may exist as a cyclic structure, including but not limited to the following examples:

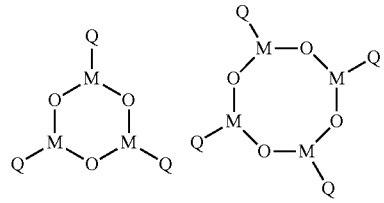

In another illustrative class of embodiments, the poly-oxo-metal carboxylate compound may have the formula $(MQO)nQ'Q''$. It may exist as a linear structure, including but not limited to the following example.

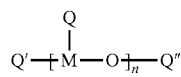

In the above formulas, M is a metal from Groups 2 to 14 according to a class of embodiments and in other embodiments, are selected from the group of Al, Mg, Ca, Sr, Sn, Ti, V, Ba, Zn, Cd, Hg, Mn, Fe, Co, Ni and Pd; O is oxygen; Q is a carboxylate moiety, where the carboxylate ligand may have 2-24 carbon atoms and may include acetate, propionate, butyrate, valerate, pivalate, caproate, isobutylacetate, t-butylacetate, cabrylate, haptanate, pelargonate,undecanoate,oleate, octoate, palmitate, myristate, margarate, stearate, arachate, tercosanoate and the like; Q' may be Q or any R group and Q" can be H, R—C(O)—R wherein R is a hydrocarbyl radical having 2-100 carbon atoms including alkyl, aryl, aromatic, aliphatic, cyclic, saturated, unsaturated; n may be an integer from 3 to 25. Non limiting examples of R include, alkyl, cycloalkyl, aryl, alkenyl, arylalkyl, alkylary.

Other embodiments of poly-oxo-metal carboxylate compounds may include, but are not limited to, poly-oxo-titanium stearate, poly-oxo-tin stearate, poly-oxo-boron stearate and poly-oxo-strontium stearate.

The poly-oxo-metal carboxylate compound in one embodiment may be combined with antistatic agents such as amines, for example, IRGASTAT AS 990/2 zinc additive, a blend of ethoxylated stearyl amine and zinc stearate, or IRGASTAT AS 990/3, a blend of ethoxylated stearyl amine, zinc stearate and octadecyl-3,5-di-tert-butyl-4-hydroxyhydrocinnamate. Both the AS 990/2 and AS 990/3 blends are available from Crompton Corporation of Memphis, Tenn.

Methods of Preparing the Catalyst Composition

The method for making the catalyst composition generally involves contacting the catalyst compound with the poly-oxo-metal carboxylate compound. It is understood that contacting may also refer to combining, blending, mixing or the like.

In one embodiment, a conventional-type transition metal catalyst and/or a metallocene catalyst is combined, contacted, blended, and/or mixed with a poly-oxo-metal carboxylate compound. The conventional-type transition metal catalyst and/or the metallocene catalyst may be supported. In another embodiment, the steps of the method of the invention include forming a polymerization catalyst, such as forming a supported polymerization catalyst, and contacting the polymerization catalyst with a poly-oxo-metal carboxylate compound. In an illustrative embodiment, the polymerization catalyst comprises a catalyst compound, an activator or cocatalyst, and a support, where the catalyst may be a supported metallocene catalyst.

One skilled in the art recognizes that depending on the catalyst system and the poly-oxo-metal carboxylate compound used, certain conditions of temperature and pressure would be required to prevent, for example, a loss in the activity of the catalyst system.

In one embodiment, poly-oxo-metal carboxylate compound is introduced directly into the reactor in the presence of a supported catalyst system. In another embodiment, the poly-oxo-metal carboxylate compound is introduced directly into the reactor in the presence of metallocene catalyst system or conventional-type transition metal catalyst system under ambient temperatures and pressures.

In alternative embodiment, introduction of the poly-oxo-metal carboxylate compound directly into the reactor in the presence of a supported catalyst system may vary depending on one or more of the conditions, temperature and pressure, the type of mixing apparatus, the quantities of the components to be combined, and even the mechanism for introducing the polymerization catalyst/poly-oxo-metal carboxylate compound combination into the reactor.

In a class of embodiments, the ratios of amount of poly-oxo-metal carboxylate compound to the amount of polymer produced in the reactor at any time may be between 0.5 ppm and 1000 ppm, and between 1 ppm and 400 ppm in another embodiment and between 5 ppm and 50 ppm in yet another embodiment.

Without being bound to theory in some embodiments, it is believed that the more metal of the activator, for example total aluminum content or free aluminum content (the alkyl aluminum content in alumoxane), present in the catalyst, the more poly-oxo-metal carboxylate compound is required. Manipulating the amounts or loadings of the catalyst components, i.e., the free aluminum, may provide a means for adjusting the level of poly-oxo-metal carboxylate compound.

Techniques and equipment contemplated for use in the method of the invention are well known. Mixing or contacting techniques may involve any mechanical mixing means, for example shaking, stirring, tumbling, and rolling. Another technique contemplated involves the use of fluidization, for example, in a fluid bed reactor vessel where circulated gases provide the contacting.

In one embodiment, a supported metallocene catalyst, is tumbled with a poly-oxo-metal carboxylate compound for a period of time such that a substantial portion of the supported catalyst is mixed and/or substantially contacted with the poly-oxo-metal carboxylate compound. The poly-oxo-metal carboxylate compound may also be pre-mixed with a cocatalyst or activator such as, an organo metallic compound, such as, MAO or MMAO, before being introduced into the reactor.

In another embodiment, the catalyst system of the invention is supported, preferably the supported catalyst system is substantially dried, preformed, and/or free flowing. In a method of the invention, the preformed supported catalyst system is contacted with the poly-oxo-metal carboxylate compound. The poly-oxo-metal carboxylate compound may be in solution, emulsion, or slurry. In another embodiment, the poly-oxo-metal carboxylate compound is contacted with a supported catalyst system, preferably a supported metallocene catalyst system in a rotary mixer under a nitrogen atmosphere, most preferably the mixer is a tumble mixer, or in a fluidized bed mixing process.

In another illustrative embodiment, a metallocene catalyst compound, is contacted with a support to form a supported catalyst compound. In this method, an activator for the catalyst compound is contacted with a separate support to form a supported activator. It is contemplated in this particular embodiment of the invention, that a poly-oxo-metal carboxylate compound is then mixed with the supported catalyst compound or the supported activator, in any order, separately mixed, simultaneously mixed, or mixed with only one of the supported catalyst, or preferably the supported activator prior to mixing the separately supported catalyst and activator.

In an embodiment, the method of the invention provides for co-injecting unsupported catalyst and a poly-oxo-metal carboxylate compound into the reactor. In one embodiment the catalyst is unsupported, preferably in a liquid form such as described in U.S. Pat. Nos. 5,317,036 and 5,693,727 and European publication EP-A-0 593 083. The catalyst in liquid form may be fed with a poly-oxo-metal carboxylate compound to a reactor using the injection methods described, for example, in WO 97/46599.

In a class of embodiments, where the poly-oxo-metal carboxylate compound and an unsupported metallocene catalyst system combination are utilized, the mole ratio of the metal of the activator component to the metal of the metallocene catalyst compound is in the range of between 0.3:1 to 10,000:1, preferably 100:1 to 5000:1, and most preferably 500:1 to 2000:1.

Polymerization Processes

The catalysts and catalyst systems of the invention described above are suitable for use in any prepolymerization and/or polymerization process over a wide range of temperatures and pressures. The temperatures may be in the range of from −60° C. to about 280° C., preferably from 50° C. to about 200° C.; and from 60° C. to 120° C. in yet a more particular embodiment, and from 70° C. to 100° C. in yet another embodiment, and from 80° C. to 95° C. in yet another embodiment, wherein a desirable temperature range may include any combination of any upper limit with any lower limit described herein.

Polymerization processes may include solution, gas phase, slurry phase and a high pressure process or a combination thereof In illustrative embodiments, a gas phase or slurry phase polymerization of one or more olefins at least one of which is ethylene or propylene is provided.

In one embodiment, the process of this invention is directed toward a solution, high pressure, slurry or gas phase polymerization process of one or more olefin monomers having from 2 to 30 carbon atoms, preferably 2 to 12 carbon atoms, and more preferably 2 to 8 carbon atoms. The invention is particularly well suited to the polymerization of two or more olefins or comonomers such as ethylene, propylene, 1-butene, 1-pentene, 4-methyl-1-pentene, 1-hexene, 1-octene 1-decene or the like.

Other olefins useful in the process of the invention include ethylenically unsaturated monomers, diolefins having 4 to 18 carbon atoms, conjugated or nonconjugated dienes, polyenes, vinyl monomers and cyclic olefins. Monomers useful in the invention may include, but are not limited to, norbornene, norbornadiene, isobutylene, isoprene, vinylbenzocyclobutane, styrenes, alkyl substituted styrene, ethylidene norbornene, dicyclopentadiene and cyclopentene.

In an illustrative embodiment of the process of the invention, a copolymer of ethylene is produced, where with ethylene, a comonomer having at least one alpha-olefin having from 4 to 15 carbon atoms, preferably from 4 to 12 carbon atoms, and most preferably from 4 to 8 carbon atoms, is polymerized in a gas phase process.

In another embodiment of the process of the invention, ethylene or propylene is polymerized with at least two different comonomers, optionally one of which may be a diene, to form a terpolymer.

In one embodiment, the invention is directed to a polymerization process, particularly a gas phase or slurry phase process, for polymerizing propylene alone or with one or more other monomers including ethylene, and/or other olefins having from 4 to 12 carbon atoms.

Typically in a gas phase polymerization process a continuous cycle is employed where in one part of the cycle of a reactor system, a cycling gas stream, otherwise known as a recycle stream or fluidizing medium, is heated in the reactor by the heat of polymerization. This heat is removed from the recycle composition in another part of the cycle by a cooling system external to the reactor. Generally, in a gas fluidized bed process for producing polymers, a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228)

The reactor pressure in a gas phase process may vary from about atmospheric pressure to about 600 psig in one embodiment; and from 100 psig (690 kPa) to about 500 psig (3448 kPa) in another embodiment, preferably in the range of from about 200 psig (1379 kPa) to about 400 psig (2759 kPa), more preferably in the range of from about 250 psig (1724 kPa) to about 350 psig (2414 kPa).

The reactor temperature in a gas phase process may vary from about 30° C. to about 120° C., preferably from about 60° C. to about 115° C., more preferably in the range of from about 70° C. to 110° C., and most preferably in the range of from about 70° C. to about 95° C.

Other gas phase processes contemplated by the process of the invention include those described in U.S. Pat. Nos. 5,627,242, 5,665,818 and 5,677,375, and European publications EP-A-0 794 200, EP-A-0 802 202, EP-A2 0 891 990 and EP-B-634 421.

In an embodiment, the reactor utilized in the present invention is capable and the process of the invention is producing greater than 500 lbs of polymer per hour (227 Kg/hr) to about 200,000 lbs/hr (90,900 Kg/hr) or higher of polymer, preferably greater than 1000 lbs/hr (455 Kg/hr), more preferably greater than 10,000 lbs/hr (4540 Kg/hr), even more preferably greater than 25,000 lbs/hr (11,300 Kg/hr), still more preferably greater than 35,000 lbs/hr (15,900 Kg/hr), still even more preferably greater than 50,000 lbs/hr (22,700 Kg/hr) and most preferably greater than 65,000 lbs/hr (29,000 Kg/hr) to greater than 100,000 lbs/hr (45,500 Kg/hr).

A slurry polymerization process generally uses pressures in the range of from about 1 to about 50 atmospheres and even greater and temperatures in the range of 0° C. to about 120° C. In a slurry polymerization, a suspension of solid, particulate polymer is formed in a liquid polymerization diluent medium to which ethylene and comonomers and often hydrogen along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

A polymerization technique of the invention is referred to as a particle form polymerization, or a slurry process where the temperature is kept below the temperature at which the polymer goes into solution. Such technique is well known in the art, and described in for instance U.S. Pat. No. 3,248,179. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In an embodiment the reactor used in the slurry process of the invention is capable of and the process of the invention is producing greater than 2000 lbs of polymer per hour (907 Kg/hr), more preferably greater than 5000 lbs/hr (2268 Kg/hr), and most preferably greater than 10,000 lbs/hr (4540 Kg/hr). In another embodiment the slurry reactor used in the process of the invention is producing greater than 15,000 lbs of polymer per hour (6804 Kg/hr), preferably greater than 25,000 lbs/hr (11,340 Kg/hr) to about 100,000 lbs/hr (45,500 Kg/hr).

Examples of solution processes are described in U.S. Pat. Nos. 4,271,060, 5,001,205, 5,236,998 and 5,589,555.

One process of the invention is where the process, preferably a slurry or gas phase process is operated in the presence of a metallocene catalyst system of the invention and in the absence of or essentially free of any scavengers, such as triethylaluminum, trimethylaluminum, tri-isobutylaluminum and tri-n-hexylaluminum and diethyl aluminum chloride, dibutyl zinc and the like. This process is described in PCT publication WO 96/08520 and U.S. Pat. Nos. 5,712,352 and 5,763,543. However, it has been discovered that a polymerization process utilizing the catalyst system/poly-oxo-metal carboxylate compound combination of the invention may be operated with a small amount of scavenger with reduced or no effect on process operability and catalyst performance. Thus, in one embodiment, the invention provides a process for polymerizing olefins) in a reactor in the presence of a polymerization catalyst, a poly-oxo-metal carboxylate compound and a scavenger.

Polymer Products

The polymers produced by the process of the invention can be used in a wide variety of products and end-use applications. The polymers produced by the process of the invention may include, but are not limited to, linear low density polyethylene, low density polyethylenes, and high density polyethylenes.

The polymers, including ethylene and propylene based polymers, have a density in the range of from 0.86 g/cm$^3$ to 0.97 g/cm$^3$, preferably in the range of from 0.88 g/cm$^3$ to 0.965 g/cm$^3$ and more preferably in the range of from 0.900 g/cm$^3$ to 0.96 g/cm$^3$.

The polymers produced by the process of the invention may have a molecular weight distribution, a weight average molecular weight to number average molecular weight ($M_w/M_n$) of greater than 1.5 to about 15, particularly greater than 2 to about 10 and more preferably greater than about 2.2 to less than about 8.

The polymers of the present invention in one embodiment may have a melt index (MI) or ($I_2$) as measured by ASTM-D-1238-E (190/2.16) in the range from 0.01 dg/min to 1000 dg/min, more preferably from about 0.01 dg/min to about 100 dg/min and even more preferably from about 0.1 dg/min to about 100 dg/min.

The polymers of the invention in an embodiment may have a melt index ratio ($I_{21}/I_2$) ($I_{21}$ is measured by ASTM-D-1238-F, [190/21.6]) of from 5 to 300, more preferably from about 10 to less than 250, and from 15 to 200 in yet another embodiment, and from 20 to 180 in yet another embodiment.

In yet another embodiment, propylene based polymers are produced in the process of the invention. These polymers may include, but are not limited to, atactic polypropylene, isotactic polypropylene, hemi-isotactic and syndiotactic polypropylene. Other propylene polymers may include propylene block or impact copolymers.

The polymers of the invention may be blended and/or coextruded with any other polymer. Non-limiting examples of other polymers include linear low density polyethylenes produced via conventional and/or single-site catalysis, elastomers, plastomers, high pressure low density polyethylene, high density polyethylenes, polypropylenes and the like.

Polymers produced by the process of the invention and blends thereof are useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description of how to make and use the compounds of the invention, and are not intended to limit the scope of that which the inventors regard as their invention.

The values for Fouling Index in the Tables below provide an indication of operability of the catalyst composition. In cases of higher Fouling Index, greater reactor fouling is observed. A Fouling Index of zero means substantially no fouling or no visible indication of fouling. A Fouling Index of 1 may indicate light fouling while a Fouling Index of 2 indicates more than light fouling. A Fouling Index of 3 is considered medium fouling and a Fouling Index of 4 is evidence of more than medium fouling. By way of example, a reaction with a Fouling Index of 1 may exhibit very light partial coating of polymer on the stirrer blades of a 2 liter slurry polymerization reactor and/or exhibit no reactor body sheeting. In the same reaction with a Fouling Index of 2, the stirrer blades may have a heavier, paint-like, coating of polymer and/or the reactor body wall can have some sheeting in a band of 1 to 2 inches wide on the reactor wall. In a similar reaction with a Fouling Index of 3, stirrer blades may have a thicker, latex-like coating of polymer, some soft chunks of polymer may reside in the reactor, and/or some body sheeting with a band of 2 to 3 inch wide may exist on the reactor wall. In a comparable reaction, a Fouling Index of 4 is evidence of more than medium fouling, where the stirrer has a thick, latex-like coating of polymer, some harder chunks/balls of polymer may reside in the reactor and/or body sheeting with a band or more than 3 inches wide may exist on the reactor wall.

Activity in the Tables below is measured in grams of polyethylene (PE) per gram of polymerization catalyst per hour of polymerization time (gPE/gCat*hr). Additive including Aluminum Stearate is available from Chemtura Corporation (Middlebury, Conn.) and Poly-oxo-aluminum stearate is available from FedChem (Cleveland, Ohio).

Preparation of Catalyst A (A Supported Metallocene Catalyst)

To a 2 gallon jacked reactor was added 1247 g of 30 wt % methylaluminoxane (MAO) (from Albemarle Corporation, Baton Rouge, La.). 2L of anhydrous toluene was added into the reactor while stirring, followed by the addition of 22.3 g of dimethylsilyl bis(tetrahydro-indenyl)zirconium dichloride (a bridged metallocene compound) also from Albemarle, which was dissolved in 250 ml of toluene, forming the activated metallocene solution. The mixture was stirred for 1 hour at 38° C. Ineos ES70 silica dehydrated at 600° C., was used as a support. 1000 g of ES70 silica was added slowly to the MAO/metallocene solution, allowing the time for good mixing and distribution of the solid into the liquid. After all the silica was added, the slurry was mixed for an additional 30 minutes at 38° C. A 10% toluene solution of IRGASTAT AS-990 (from Ciba Specialty Chemicals) (28.8 g) was finally added to the reactor and the mixture was stirred for 30 minutes. The catalyst was dried at 80° C. until it is a free flowing solid.

Preparation of Catalyst B (A Supported Non-Metallocene Catalyst):

A bisamide compound [(2,3,4,5,6 Me$_5$C$_6$)NCH$_2$CH$_2$]$_2$NHZrBz$_2$ from Boulder Chemical was activated with methylaluminoxane (MAO) from Albemarle Corporation. The mixture was then supported on silica Cabosil TS 610 (available from Cabot Corporation) in a pilot scale spray dryer. The composition of the spray dried catalyst was Zr with 0.035 mmol/g of catalyst and Al with 5.7 mmol/g of catalyst.

Examples 1-4

Catalyst A Polymerization

To prepare for polymerization, the 2-liter autoclave reactor was cleaned and purged hot with nitrogen to remove moisture and oxygen. The reactor was cooled to ambient temperature and purged with ethylene to replace the nitrogen atmosphere. Twenty milliliters (20 ml) of dry 1-hexene comonomer was introduced to the reactor. As a scavenger, 0.15 ml of a 1M solution of triisobutylaluminum in hexane was added to the reactor. The poly-oxo-aluminumstearate in solvents such as Exxsol D60 and Exxprint 283D in concentrations from 2-95 wt % in a class of embodiments and in concentrations of 40-60 wt % in other embodiments were introduced to the reactor. As a diluent, 800 ml of dry isobutane was added to the reactor. Reactor stirrer speed was set at 1000 RPM. Reactor was heated to 85° C. and 100 mg of catalyst was introduced. Reactor pressure was set at 325 psig and temperature was maintained at 85° C. during the polymerization. After 40 minutes, ethylene flow was stopped and the reactor was cooled to ambient temperature and vented to atmospheric pressure. Polymer was recovered, dried and weighed. Conditions of the reactor wall, agitator and thermocouple as regards to polymer coating and adhesion were noted and a fouling index number was assigned.

TABLE 1

| Examples | Catalyst | Additive Type | Additive amount (mg) | Activity (gPE/gCat*hr) | Fouling Index |
| --- | --- | --- | --- | --- | --- |
| 1 (Comparative) | A | None | 0 | 2475 | 2 |
| 2 (Comparative) | A | Aluminum Stearate Powder | 3.2 | 2400 | 0 |
| 3 (Inventive) | A | Poly-oxo-Aluminumstearate Liquid | 5.0 | 2790 | 0 |
| 4 (Inventive) | A | Poly-oxo-Aluminumstearate Liquid | 2.5 | 2295 | 0 |

Examples 5-8

Non-Metallocene Catalyst Polymerization

To prepare for polymerization the 2-liter autoclave reactor was cleaned and purged hot with nitrogen to remove moisture and oxygen. The reactor was cooled to ambient temperature and purged with ethylene to replace the nitrogen atmosphere. Five milliliters (5 mL) of dry 1-hexene comonomer was introduced to the reactor. As a scavenger, a 25 mg of TEAL treated silica was added to the reactor. The poly-oxo-aluminumstearate in solvents such as Exxsol D60 and Exxprint 283D in concentrations from 2-95 wt % in a class of embodiments and in concentrations of 40-60 wt % in other embodiments were introduced to the reactor. As a diluent, 800 ml of dry isobutane was added to the reactor. The reactor stirrer speed was set to 1000 RPM. Hydrogen in the amount of 2.48 mmol was added to the reactor. The reactor was then heated to 85° C. and 50 mg of catalyst was introduced. The pressure in the reactor was set at 275 psig and the temperature was maintained at 85° C. during the polymerization. After 30 minutes ethylene flow was stopped and the reactor was cooled to ambient temperature and vented to atmospheric pressure. The resulting polymer was recovered, dried and weighed. Conditions of the reactor wall, agitator and thermocouple as regards to polymer coating and adhesion were noted and a fouling index number was assigned.

TABLE 2

| Examples | Catalyst | Additive Type | Additive amount (mg) | Activity (gPE/gCat*hr) | Fouling Index |
| --- | --- | --- | --- | --- | --- |
| 5 (Comparative) | B | None | 0 | 1740 | 2 |
| 6 (Comparative) | B | Aluminum Stearate Powder | 7.0 | 600 | 0 |
| 7 (Inventive) | B | Poly-oxo-Aluminumstearate Liquid | 3.0 | 1140 | 0 |
| 8 (Inventive) | B | Poly-oxo-Aluminumstearate Liquid | 7.8 | 640 | 0 |

Example 9

Polymer Resin with and without Poly-Oxo-Metal Carboxylate Compound

Figure 2:
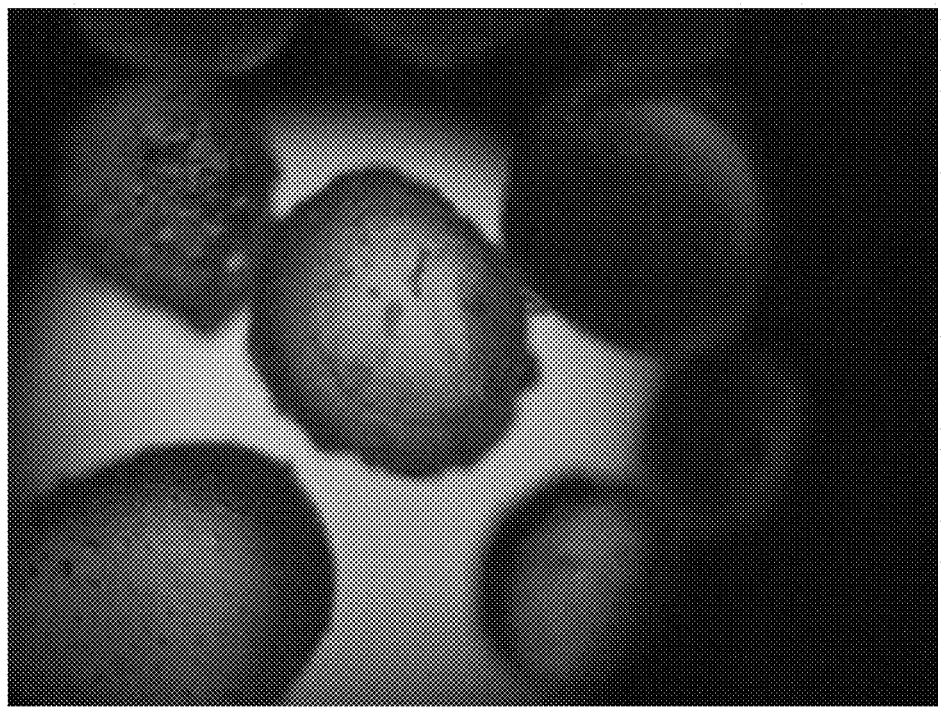
FIG. 2 depicts polymer resin with a poly-oxo-metal carboxylate compound heated at 140° C.

Experimental observation using hot stage microscopy to provide visual characterization of thermal transitions of a compound produced unexpected results regarding the occurrence of particle fusion in various polymer resins. An Olympus BX-50 microscope was utilized with a Linkam Hot stage unit to provide controlled heating of a sample of resin at an initial rate of 5° C. and subsequently 10° C. to observe the fusion of polymer particles. In the case of raw polymer resin, as shown in FIG. 1, which does not contain any continuity additive, for example, poly-oxo-metal carboxylate compound, the polymer particles are agglomerating and fused into a single mass at 140° C. Conversely, the particles of the same resin containing poly-oxo-metal carboxylate compound, as seen in FIG. 2, under the same conditions, are kept from agglomerating and fusing into a single mass.

The phrases, unless otherwise specified, "consists essentially of" and "consisting essentially of" do not exclude the presence of other steps, elements, or materials, whether or not, specifically mentioned in this specification, as along as such steps, elements, or materials, do not affect the basic and novel characteristics of the invention, additionally, they do not exclude impurities normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the present invention has been described and illustrated by reference to particular embodiments and/or aspects, those of ordinary skill in the art will appreciate that the invention lends itself to modifications, additions, substitutions, variations, deletions and other changes not necessarily disclosed herein. The embodiments and/or aspects of the present invention are, therefore, to be considered in all respects as illustrative and not restrictive. For this reason, reference should be made solely to the appended claims for purposes of determining the true scope of the present invention.

What is claimed is:

1. A catalyst composition comprising:
   at least one catalyst compound, wherein the at least one catalyst compound is selected from the group consisting of a Ziegler-Natta catalyst, a Phillips-type chromium catalyst, a metallocene catalyst, a group 15-containing catalyst, and a combination thereof; and
   at least one poly-oxo-metal carboxylate compound; wherein the at least one poly-oxo-metal carboxylate compound is a liquid linear or cyclic compound represented by the formula:

$(MQO)_n$ wherein M is a metal selected from the group consisting of Al, Mg, Ca, Sr, Sn, Ti, V, Ba, Zn, Cd, Hg, Mn, Fe, Co, Ni, and Pd; Q is a carboxylate group having 2-24 carbons; O is oxygen; and n is an integer between 3 and 25.

2. The catalyst composition of claim 1, wherein the poly-oxo metal carboxylate compound is a compound further bonded to a Q' and a Q" wherein Q' is Q or any R group, wherein R is a hydrocarbyl radical and Q" is H, R or —C(O)—R wherein R is a hydrocarbyl radical.

3. The catalyst composition of claim 1, wherein the poly-oxo-metal carboxylate compound is poly-oxo-aluminum stearate.

4. The catalyst composition of claim 1, further comprising an activator, wherein the activator is selected from the group consisting of a Lewis acid, a non-ionizing activator, an ionizing activator, a supported activator, an alkylaluminum compound, alumoxane, and a combination thereof.

5. A process for polymerizing olefins, the process comprising:
   contacting olefins and a liquid poly-oxo-metal carboxylate compound in the presence of at least one catalyst compound, wherein the at least one catalyst compound is selected from the group consisting of a Ziegler-Natta, a Phillips-type chromium catalyst, a metallocene catalyst, a group 15-containing catalyst, and a combination thereof,
   wherein the poly-oxo-metal carboxylate compound is represented by the formula:

$(MQO)_n$ wherein M is a metal selected from the group consisting of Al, Mg, Ca, Sr, Sn, Ti, V, Ba, Zn, Cd, Hg, Mn, Fe, Co, Ni, and Pd; Q is a carboxylate group having 2-24 carbons; O is oxygen; and n is an integer between 3 and 25.

6. The process of claim 5, wherein the poly-oxo metal carboxylate compound is a compound further bonded to a Q' and a Q" wherein Q' is Q or any R group, wherein R is a hydrocarbyl radical and Q" is H, R or —C(O)—R wherein R is a hydrocarbyl radical.

7. The process of claim 5, wherein the poly-oxo-metal carboxylate compound is poly-oxo-aluminum stearate.

8. The process of claim 5, wherein the catalyst composition comprises an activator, wherein the activator is selected from the group consisting of a Lewis acid, a non-ionizing activator, an ionizing activator, a supported activator, an alkylaluminum compound and alumoxane.

9. The process of claim 5, wherein the olefins are selected from the group consisting of ethylene, propylene, butene, hexene, and a combination thereof.

10. A method of producing a catalyst composition, the method comprising the steps of:
    providing at least one catalyst compound, wherein the at least one catalyst compound is selected from the group consisting of a Ziegler-Natta, a Phillips-type chromium catalyst, a metallocene catalyst, a group 15-containing catalyst, and a combination thereof, a metallocene catalyst, a group 15-containing catalyst, and a combination thereof; and contacting the catalyst compound with a liquid poly-oxo-metal carboxylate compound to form the catalyst composition, wherein the poly-oxo-metal carboxylate compound is a linear or cyclic compound represented by the formula:

$(MQO)_n$ wherein M is a metal selected from the group consisting of Al, Mg, Ca, Sr, Sn, Ti, V, Ba, Zn, Cd, Hg, Mn, Fe, Co, Ni, and Pd; Q is a carboxylate group having 2-24 carbons; O is oxygen; and n is an integer between 3 and 25.

11. The method of claim 10, wherein the poly-oxo metal carboxylate compound is a compound further bonded to a Q' and a Q" wherein Q' is Q or any R group, wherein R is a hydrocarbyl radical and Q" is H, R or —C(O)—R wherein R is a hydrocarbyl radical.

* * * * *